United States Patent [19]

Chwalek et al.

[11] 4,171,383

[45] Oct. 16, 1979

[54] WET MILLING PROCESS FOR REFINING WHOLE WHEAT

[75] Inventors: Vincent P. Chwalek, Los Angeles, Calif.; Richard M. Olson, North Riverside, Ill.

[73] Assignee: CPC International Inc., Englewood Cliffs, N.J.

[21] Appl. No.: 904,952

[22] Filed: May 11, 1978

[51] Int. Cl.[2] .............................................. A23K 1/00
[52] U.S. Cl. .................................... 426/623; 127/68; 426/630; 426/635
[58] Field of Search ............... 426/635, 626, 623, 630, 426/463, 464, 481–484, 518, 436, 507, 479; 127/23, 67, 68

[56] References Cited

U.S. PATENT DOCUMENTS

| | | | |
|---|---|---|---|
| 2,368,668 | 2/1945 | Langford et al. | 127/68 |
| 3,595,696 | 7/1971 | Vegter | 127/23 |
| 3,851,085 | 11/1974 | Rodgers et al. | 426/626 |
| 3,857,987 | 12/1974 | Rogols et al. | 426/462 |
| 3,909,288 | 9/1975 | Powell et al. | 426/635 |
| 4,094,700 | 6/1978 | Rennes et al. | 127/67 X |
| 4,125,528 | 11/1978 | Rao et al. | 426/479 X |

*Primary Examiner*—R. B. Penland
*Attorney, Agent, or Firm*—Stanley M. Parmerter

[57] ABSTRACT

There is disclosed a continuous process for refining whole grain wheat to obtain a wheat starch fraction and an animal feed product, the process comprising cleaning whole wheat kernels to separate extraneous matter, wet milling the cleaned whole wheat kernels to provide a mill starch slurry, separating fiber (bran) tailings from the mill starch slurry, washing and dewatering the fiber (bran) tailings, separating the mill starch slurry into a starch-rich fraction and a protein-rich fraction, concentrating and dewatering the protein-rich fraction, combining the wheat cleanings, the dewatered fiber (bran) tailings and the dewatered protein-rich fraction with an aqueous concentrate resulting from the partial evaporation of the filtrates obtained during the dewatering of the protein-rich fraction to form a wet animal feed product, and drying the feed product.

20 Claims, 3 Drawing Figures

WET MILLING PROCESS FOR REFINING WHOLE WHEAT

This invention relates to a process for refining whole wheat kernels using a unique wet milling sequence which includes a first steeping step, intermediate steps for fractionating the kernel and decreasing the endosperm particle size, and a second steeping step. The wet milling procedure provides a mill starch slurry which is processed further to separate a starch fraction comprising "A" starch and to prepare an animal feed product which includes substantially all of the other insoluble wheat solids. Short steeping times and high product yields are thus provided.

BACKGROUND OF THE INVENTION

A wheat kernel is comprised of three principal component parts: (i) a fibrous outer layer or wheat bran, (ii) germ, and (iii) endosperm. The endosperm contains both wheat starch, enclosed within starch granules, and wheat gluten. Wheat starch enjoys a wide variety of applications, including use as a constituent in adhesives and paper making, as a food thickener and as a source of dextrose sugar and other food sweeteners. Wheat gluten, in its naturally occurring "vital" form, can be admixed with water to form a cohesive, pliable mass, or dough, which is useful in the preparation of bakery goods.

Methods for the refining of whole grain wheat to recover wheat starch and/or wheat gluten are known. In some refining processes, the whole wheat kernel is dry milled, i.e., by crushing, grinding, squeezing, or the like, to separate the kernel into fiber (bran), wheat germ and wheat endosperm. The endosperm fraction or fractions are milled further to provide wheat flour and the flour, in turn, is treated to separate wheat starch and wheat gluten. In a typical commercial procedure, the wheat flour is formed into a dough or batter, and as the dough or batter is mechanically worked to form a consolidated mass comprised of wheat gluten, the wheat starch is elutriated from the glutenous mass. Such processes are not entirely satisfactory because much of the wheat starch is often lost in the dry grinding and dough washing operations, and starch yields are correspondingly low. Moreover, the wheat germ and fiber (bran) are often discarded during such dry milling processes, which is inefficient.

In still other wheat refining processes, whole wheat kernels are first pre-soaked in water or an acidic solution such as sulfurous acid to soften the kernel, the soaked kernel is then wet milled to loosen or separate the branny outer layer from the endosperm, and the endosperm is processed further to separate wheat starch and/or wheat gluten. See, for example, the disclosures in Rodgers, et al U.S. Pat. No. 3,851,085, Galle, et al, U.S. Pat. No. 3,958,016 and Rao, et al, U.S. Pat. Nos. 3,790,553; 3,979,375 and 3,891,613. Because the wheat grain is very compact and has a hard outer shell, such processes usually require long soaking (steeping) times, thus tying up equipment for extended periods of time. Moreover, separation of the wheat starch from the wheat gluten is often achieved by the use of dough washing procedures, which is an inefficient means for obtaining wheat starch.

OBJECTS OF THE INVENTION

It is an object of this invention to provide a new wet milling process for the refining of whole grain wheat to obtain prime wheat starch and which makes use of all of the other constituents in end products.

It is another object of this invention to provide a wet milling process for the refining of whole grain wheat to obtain prime wheat starch in high yields while permitting shorter soaking or steeping times.

It is still another object of this invention to provide a wet milling process for the refining of whole grain wheat which avoids the need for dry grinding and dough-washing procedures that adversely affect the starch yield.

These objects are realized by the process of this invention, which is now described.

SUMMARY OF THE INVENTION

In its broadest aspects, this invention comprises a continuous wet process for the refining of whole grain wheat which comprises:

(A) cleaning whole wheat kernels to separate the extraneous vegetable matter;
(B) wet milling the cleaned whole wheat kernels of (A) by sequentially;
  (a) steeping the cleaned whole wheat kernels,
  (b) removing the wheat kernels from steeping and milling the soaked kernels while still wet,
  (c) separating the milled wheat kernels of (b) into a wet first fraction comprising germ, fiber (bran) and smaller endosperm particles and a wet second fraction comprising larger endosperm particles,
  (d) decreasing the particle size of the endosperm particles in the wet second fraction of (c), and
  (e) combining the first fraction of (c) comprising germ, fiber (bran) and smaller endosperm particles with the second fraction from (d) comprising endosperm particles of decreased size and steeping the composite to form a mill starch slurry,
(C) separating a fraction comprising fiber (bran) tailings from the mill starch slurry of (B)(e);
(D) washing and dewatering the fiber (bran) tailings fraction of (C) and combining the washwater with the defibered mill starch slurry of (C);
(E) separating the composite of (D) into a starch-rich fraction and a protein-rich fraction;
(F) concentrating and dewatering the protein-rich fraction of (E) to obtain a dewatered protein-rich fraction and a filtrate;
(G) evaporating at least a portion of the filtrate of (F) to increase the concentration of solids;
(H) combining the dewatered fiber (bran) tailings fraction of (C), the aqueous concentrate of (G) and the dewatered protein-rich fraction of (F) to provide a wet animal feed product; and
(I) drying the wet feed product of (H) to provide a final animal feed product.

Within the process of the invention as broadly described above, particle size reduction step (B)(d) comprises milling the wet second fraction of (c), to decrease the size of the endosperm particles.

Alternatively, in another aspect of the invention, particle size reduction step (B)(d) comprises returning the second fraction of (c) comprising larger endosperm particles to steeping step (a) and then milling step (b), to decrease their particle size.

DETAILED DESCRIPTION OF THE INVENTION

Figure 1:
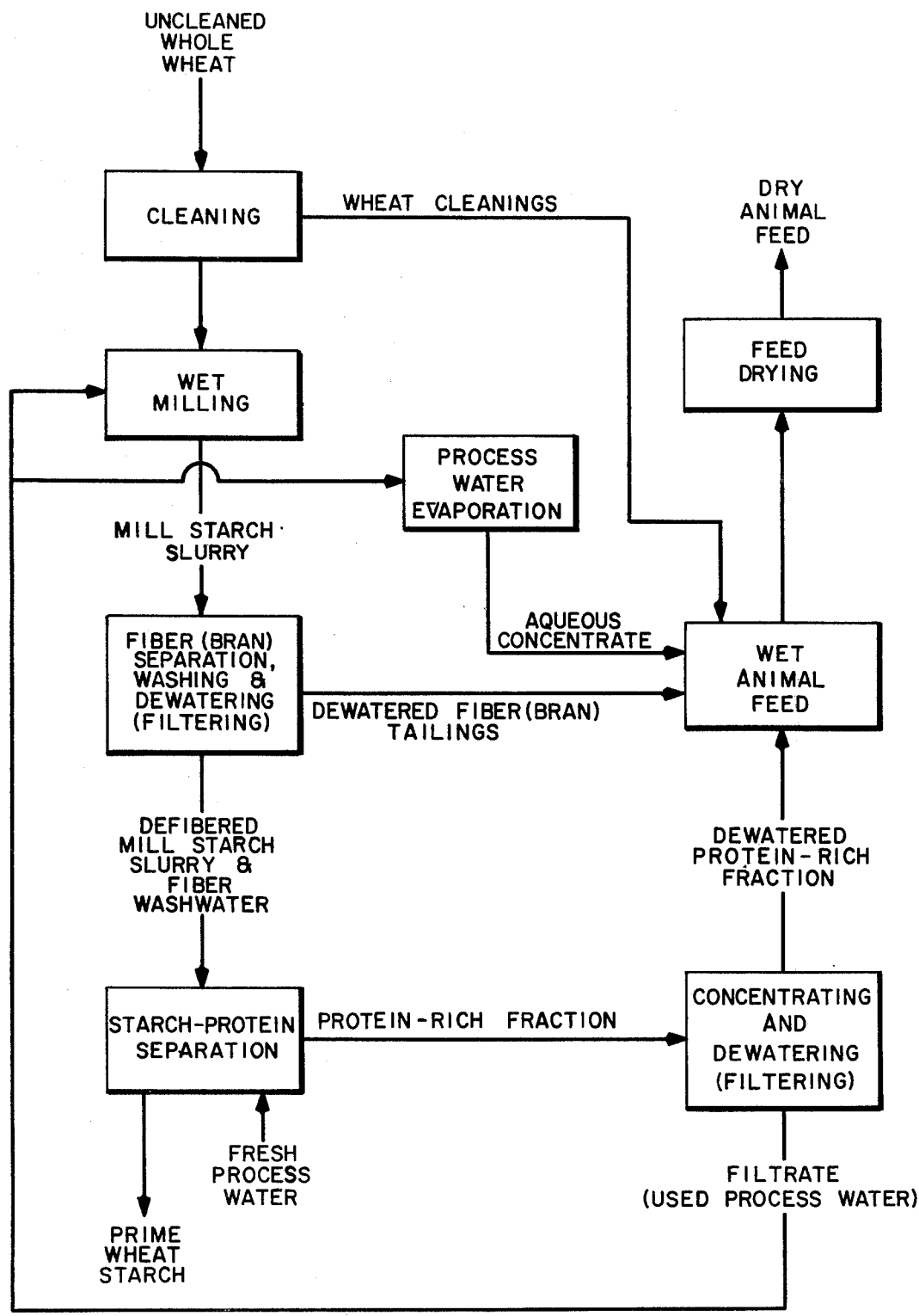
FIG. 1 is a schematic flow diagram of the process according to this invention.
Figure 2:
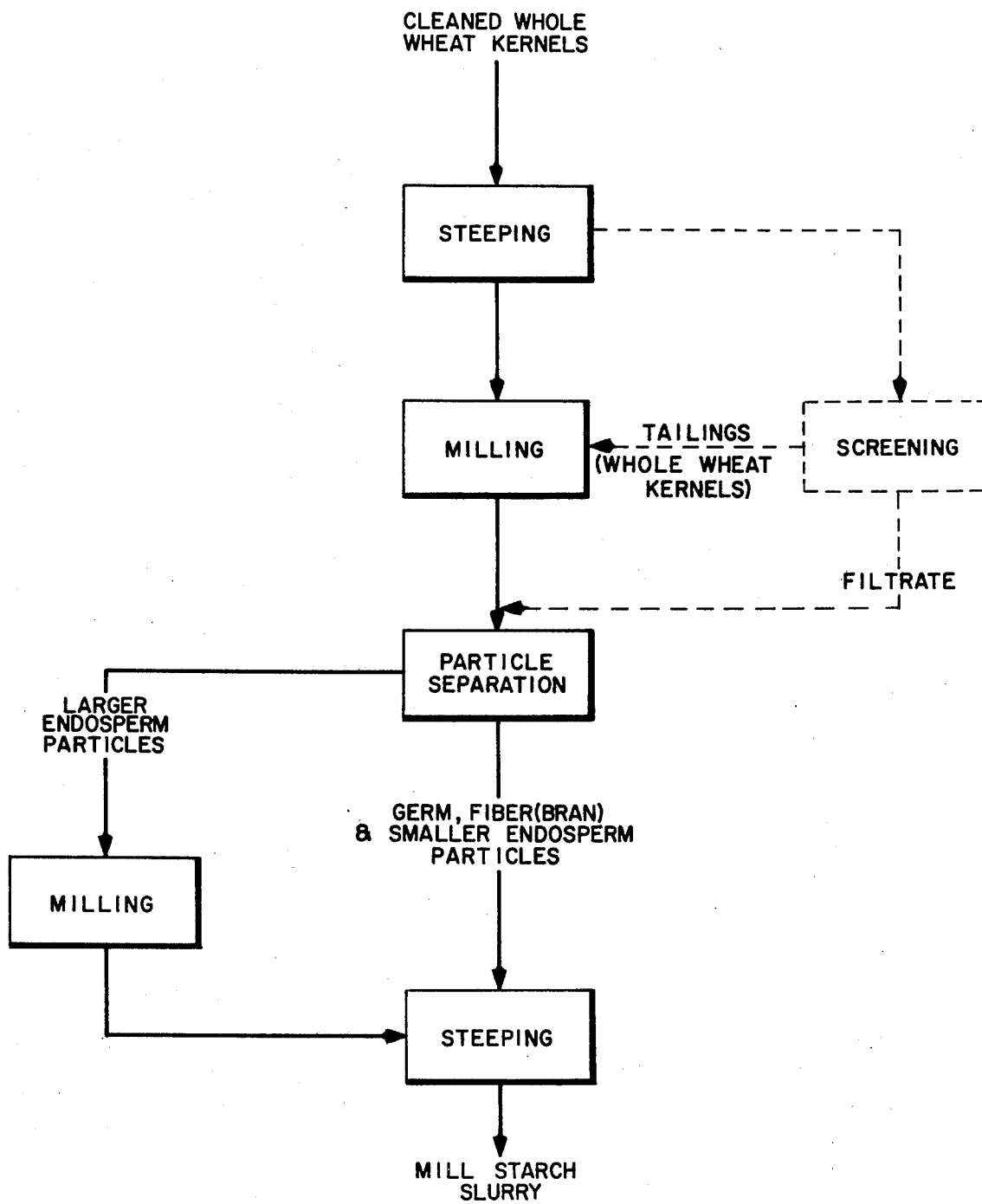
FIG. 2 is a schematic flow diagram of one embodiment of wet milling step (B), with dotted lines indicating optional feature.
Figure 3:
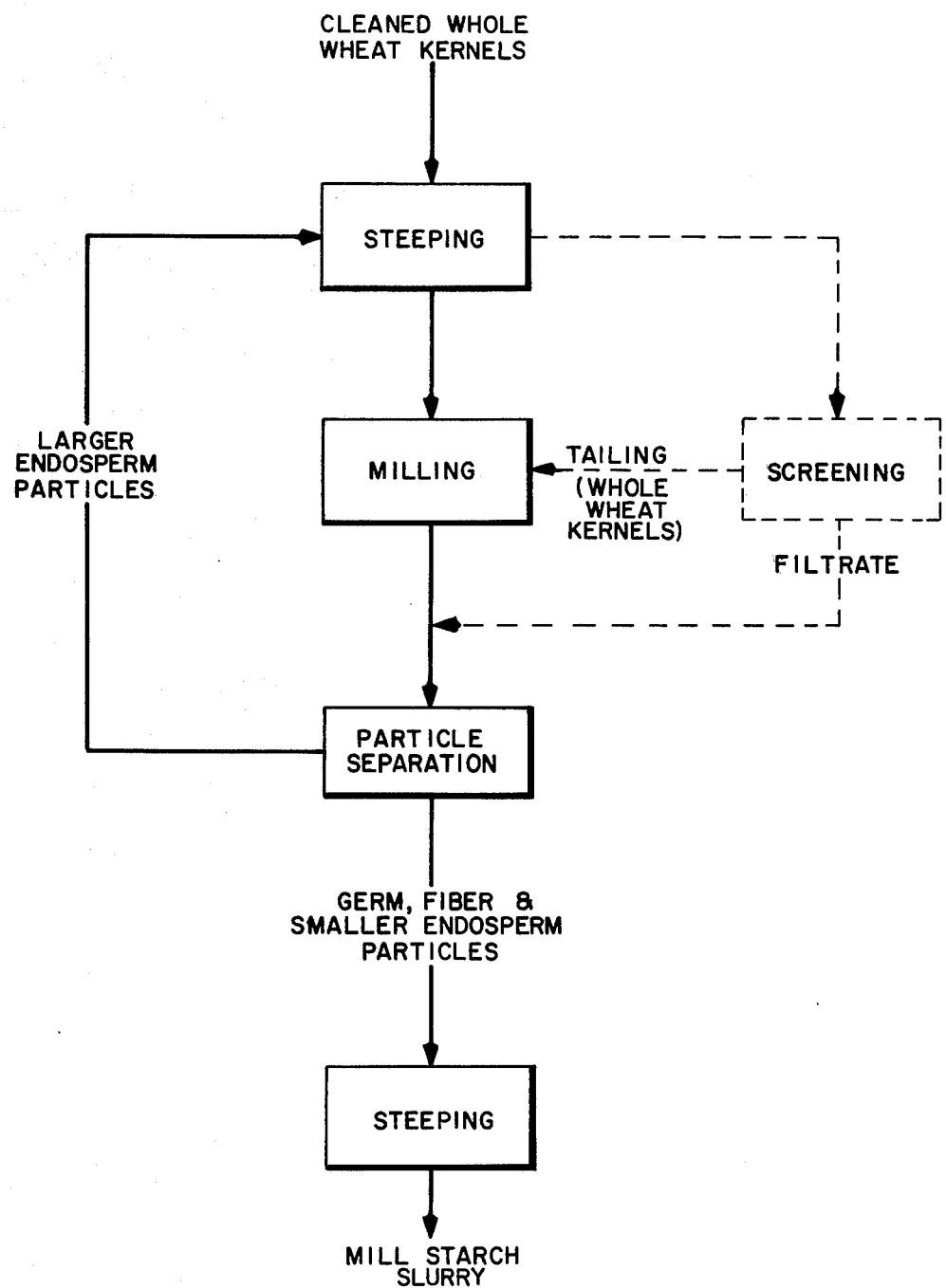
FIG. 3 is a schematic flow diagram of a second embodiment of wet milling step (B), dotted lines indicating optional feature.

By way of illustration, the process of this invention is carried out as follows:

With reference to FIG. 1, dry whole wheat kernels are cleaned, e.g., by sieving, to remove extraneous vegetable and other matter, e.g, wheat chaff. The resulting cleanings are retained for use as an ingredient in the preparation of an animal feed product. With reference to FIGS. 2 and 3, after cleaning the whole wheat kernels are immersed in a mildly acidic steeping solution, e.g., sulfurous acid, preferably having a concentration of from about 2,000 to about 4,000 parts per million (ppm) of sulfur dioxide in water, or in a mildly basic steeping solution, e.g., aqueous sodium hydroxide, preferably having a pH of from about 10 to about 11.5. Preferably, a weight ratio of water to wheat solids of from about 5:1 to about 6:1 is employed in either case. The wheat kernels are permitted to soak for a brief period, e.g., from about ¼ to about 2 hours, or until the moisture content of the wheat kernels has been brought up to about 25 to about 35% by weight, on a wet solids basis. During this first steeping period, the wheat kernels are maintained in a state of suspension in the process (steep) water by vigorous agitation, and preferably at an elevated temperature, e.g., from about 90° to about 130° F. The temperature is controlled by recirculating the process (steep) water through heat exchangers, although any other conventional means for regulating the temperature of liquids can be used.

During steeping the outer layers or shell, of some of the wheat kernels may rupture because of softening and swelling, causing constituents of the kernel such as starch granules and other insoluble wheat particles to be released into the process (steep) water. Preferably, after the first steeping step is completed the steep slurry is treated to separate such insoluble wheat particles from the whole wheat kernels. In a preferred procedure, this is done by passing the slurry through a screening device, e.g., ICM paddle screen, Model No. 77, or equivalent, having a pore size of from about 50 to about 700 microns. The tailings which are retained on the screen, comprising whole wheat kernels, are collected and milled to loosen the branny outer layer and reduce the particle size to no greater than about 700 microns, so as to facilitate the fractionation of the kernel into its component parts. The filtrate which passes through the screen, which includes free insoluble wheat particles, is combined with the discharge from the mill to form a composite of the milled and unmilled wheat particles and process (steep) water.

If desired, this optional procedure can be omitted and, instead, all of the steeped wheat particles from the first steeping step, including intact wheat kernels and free what particles, can be milled in the next step.

The discharge from the mill, or composite stream of milled and unmilled particles if the optional intermediate milling step is employed, is then separated into two fractions according to particle size and different settling rates, by passing the stream through a centrifuging device, e.g., a Bauer Cyclone, 3 in. diameter, or equivalent, to obtain a first fraction (overflow stream), comprising germ, fiber (bran) and smaller endosperm particles, preferably less than about 53 microns in size, and a second fraction (underflow stream), comprising larger endosperm particles, preferably greater than about 53 microns. The first fraction (overflow stream) is collected for direct treatment in the second steeping step, without any intermediate processing. The second fraction (underflow stream) is subjected to further milling (FIG. 2) or recycled for further steeping and milling (FIG. 3), to reduce the particle size to about 53 microns or less. After milling, the second fraction is combined with the first fraction for treatment in another distinct steeping step.

As in the case of the first steeping step, elevated temperatures, e.g., about 90° to about 130° F., are preferred in this additional steeping step, together with agitation so as to maintain the insoluble wheat solids in suspension in the process (steep) water. Since this is a continuous process, the process (steep) water is carried over from the first steeping step and there is no need to create a fresh batch of process (steep) water. As those skilled in the art will understand, the concentration of the acid or pH of the base may undergo change after being in contact with the wheat solids for any appreciable period of time. If necessary, small amounts of base or acid can be added, as needed, to readjust the process (steep) water to the desired value. In general, residence times for the wheat solids in the second steeping step of from about 1¾ to about 5¾ hours are preferred, depending on the amount of time employed in the first steeping step. Preferably, a total nominal residence time in the range of from about 2 to about 6 hours for both steeping steps combined, is employed.

With reference again to FIG. 1, after this steeping step is completed, the insoluble wheat solids, comprising germ, fiber (bran), and endosperm particles, are removed from the steep tanks in the form of a suspension in the process (steep) water, preferably having a specific gravity of from about 7° to about 9° Baumé. The slurry is then sieved, e.g., using a ROTEX Screener, Rotex, Inc., of equivalent, of suitable pore size, e.g., from about 37 to about 53 microns, to separate substantially all of the fiber (bran) and germ from the small endosperm particles. The fibrous tailings retained on the screening device are collected, washed to separate starch granules and other entrapped wheat particles, and thereafter dewatered (filtered). The filtrate, i.e., washwater, is collected and combined with the defibered mill starch slurry for further treatment to separate the slurry into a starch-rich fraction and a protein-rich fraction.

Illustratively, the separation treatment is carried out by the use of an all DorrClone system, such as is disclosed in copending application Ser. No. 734,683, filed Oct. 22, 1976, now U.S. Pat. No. 4,144,087; systems comprising centrifuges for starch separation and hydroclones for starch washing; or systems comprising centrifuges for both starch separation and starch washing.

For example, the defibered mill starch slurry can be passed through a plurality of hydroclones, e.g., from about 11 to about 13 stages in countercurrent arrangement. The internal diameter and the included conical angle of the hydroclone units and the pressure drop across each stage of units are selected to produce a rotational velocity of the feed material, i.e., mill starch slurry, which is sufficient to result in a separation of wheat starch from gluten-protein. In general, for a standard hydroclone unit of from about 7 to about 10 millimeters (mm) internal diameter, the following are sufficient: an included conical angle of from about 5° to about 7.5° and a pressure drop of from about 80 to about 150 psi across each stage.

The terms "A starch" and "B starch" are recognized in the art to distinguish roughly between two types of wheat starch, comprising granules which differ according to their respective particle sizes and settling rates. B starch comprises starch granules which settle at about the same rate as wheat gluten and, thus, these two are not readily separatable using conventional techniques and equipment. A starch, on the other hand, comprises starch granules which differ sufficiently in settling characteristics from both wheat gluten and B starch so as to be readily separated from them.

The underflow from the eleventh stage, comprising an A starch-enriched stream, is collected for drying. This yields a high quality wheat starch. The overflow from the first stage, comprising a protein-enriched stream which also contains B starch, is concentrated to facilitate filtering by centrifuging to remove some of the water, and then dewatered (filtered) or the centrifuged solids can be processed directly without filtration. The filtrate or centrifugate is evaporated to form an aqueous concentrate having a solids content of about 50% by weight or less. The solid residue from the filter is combined with the wheat cleanings fraction, the aqueous concentrate from the evaporation step and the dewatered (filtered) fibrous tailings from the fiber (bran) separation, washing and dewatering steps, to provide a wet animal feed composite. The wet composite is dried in a heated enclosure, preferably at a temperature of from about 215° to about 250° F., down to a moisture of from 10 to 12%, to provide a final animal feed product.

In preferred embodiments, the process water from the protein-rich fraction concentrating and dewatering (filtering) step is split into two distinct streams, one of which is subjected to evaporation to form an aqueous concentrate, as described, and the other of which is recycled back to the wet milling section of the process for further use in steeping. A very efficient use of the process water is thus made.

It is noteworthy that all of the milling during the process is done while the wheat particles are wet, which avoids damage to the starch granules.

In general, the process of this invention provides from about 53 to about 59% by weight of prime wheat starch (representing a starch yield from about 85 to about 90% by weight based on the total weight of endosperm solids), and from about 41 to about 47% by weight of dry animal feed. The animal feed contains from about 25 to about 32% by weight of wheat protein.

DESCRIPTION OF THE SPECIFIC EMBODIMENTS

The process of this invention is illustrated further in the following examples:

EXAMPLE

One-hundred and two pounds of uncleaned whole red winter wheat containing about 12.2% by weight of protein, on a dry solids basis, are passed through a sieve comprising round holes of ¼-inch in diameter, and then over a 12 mesh size wire screen. Substantially all of the wheat chaff and other extraneous matter are separated from the whole wheat kernels, yielding about 2 pounds of wheat cleanings.

The cleaned whole wheat kernels are supplied to a stainless steel tank, capacity 190 gallons, at a rate of 3 pounds of wheat per minute together with water at a rate of 1.89 gallons per minute. The mixture of whole wheat kernels and water is agitated vigorously to maintain the wheat solids in uniform or nearly uniform suspension. Gaseous sulfur dioxide is supplied to the mixture from a pressurized cylinder at a rate of 0.05 pounds of gas per minute, which is sufficient to provide a sulfur dioxide concentration, based on the water phase, of 2,000 parts per million. The temperature of the process (steep) water in the tank is maintained at 118° F. by recirculating the water through heat exchanging devices. The nominal residence time for the mixture in the tank is 1½ hours.

After this period, the mixture of whole wheat kernels and process (steep) water is gravitated into an ICM paddle screen, Model No. 77, which has been fitted with a 28-mesh screening surface. The wheat particles of greater than 700 microns in size are retained on the screening surface. These are collected and sent to a 35-cm (14 inches) Entoleter impact mill, Centrimil model, operated at a speed of 4,200 revolutions per minute, to reduce the particle size to less than about 700 microns. The filtrate from the paddle screen, comprising process (steep) water and wheat particles having a size of 700 microns or less, is combined with the discharge from the impact mill, comprising wheat particles which have been reduced in size to 700 microns or less.

The composite is fed into a 7.6-cm (3 inches) Bauer Cyclone, which is operated with a pressure drop of 0.35 kg/cm$^2$ (5 psi). The overflow stream from the centrifuge, comprising process (steep) water, wheat germ, wheat fiber (bran) and endosperm particles having a particle size of less than about 53 microns, is sent to a stainless steel steep tank having a capacity of 300 gallons. The underflow stream from the centrifuging device, comprising process (steep) water and endosperm particles having a particle size of greater than about 53 microns, is recycled back to the first steep tank, capacity 190 gallons, for further steeping and milling.

The wheat particles in the second steep tank are maintained in suspension by vigorous agitation, at a temperature of 118° F., for a nominal residence time of 2½ hours. After this period, the mixture of wheat particles and process (steep) water, or mill starch slurry, having a specific gravity of about 8° Baumé, is passed through a ROTEX screening device, fitted with a NITEX cloth having pore openings of 37 microns in diameter. The tailings of which are retained on the cloth, comprising fine wheat fiber and starch granules, are collected, washed with water to separate the trapped wheat starch granules, and filtered. The filtrate from the ROTEX screening device and the wash water from the fibrous tailings are combined into a single stream, which is then passed through a hydroclone separating system, consisting of eleven 10-mm Dorr-Clone stages.

The underflow stream from the eleventh, or last stage, comprises A starch, and this is collected for drying to yield a prime wheat starch product. The overflow stream, comprising B starch and wheat gluten protein, is collected, concentrated and dewatered (filtered). The filtrate not reused in the process is evaporated to a solids content of about 50% by weight. The solid residue retained on the filter is combined with the concentrated filtrate and the wheat cleanings fraction and fibrous tailings fraction collected previously during the process, to form a wet animal feed composite. The wet composite is dried at about 250° F. to a moisture content of about 10 to 12% to provide a dry animal feed product.

A yield of 54 pounds of prime wheat starch, or 53% by weight, and a yield of 48 pounds of dry animal feed, or 47% by weight, are thus obtained. The animal feed contains 12.3 pounds of protein, or 25% by weight, dry solids basis.

Other modifications and variations of the process of this invention will suggest themselves from the above description. It is to be understood, therefore, that changes may be made in the embodiments shown therein without departing from the scope of the invention as defined in the appended claims.

We claim:

1. A continuous wet wheat refining process, which comprises:
   (A) cleaning whole wheat kernels to separate the extraneous vegetable matter;
   (B) wet milling whole wheat kernels by sequentially:
      (a) steeping the whole wheat kernels,
      (b) removing the soaked wheat kernels from steeping and milling them while wet to reduce the particle size,
      (c) separating the milled kernels of (b) into a first fraction comprising germ, fiber (bran) and smaller endosperm particles, and a second fraction comprising larger endosperm particles,
      (d) decreasing the particle size of the endosperm particles in the wet second fraction of (c), and
      (e) combining the first fraction of (c) comprising germ, fiber (bran) and smaller endosperm particles with the second fraction from (d) comprising endosperm particles of decreased size and steeping the composite to form a mill starch slurry,
   (C) separating a fraction comprising fiber (bran) tailings from the mill starch slurry of (B)(e);
   (D) washing and dewatering the fiber (bran) tailings fraction of (C) and combining the washwater with the defibered mill starch slurry of (C);
   (E) separating the composite of (D) into a starch-rich fraction and a protein-rich fraction;
   (F) concentrating and dewatering the protein-rich fraction of (E) to obtain a dewatered protein-rich fraction and filtrate;
   (G) evaporating at least a portion of the filtrate of (F) to increase the concentration of solids;
   (H) combining the cleanings of (A), the dewatered fiber (bran) tailings fraction of (C), the aqueous concentrate of (G) and the dewatered protein-rich fraction of (F) to provide a wet animal feed product; and
   (I) drying the wet feed product of (H) to provide a final animal feed product.

2. The process of claim 1 wherein (B)(d) comprises milling the wet second fraction of (c) to decrease the size of the endosperm particles.

3. The process of claim 1 wherein (B)(d) comprises returning the second fraction of (c) comprising larger endosperm particles to steeping step (a) and then milling step (b) to decrease their particle size.

4. The process of claim 1 wherein steps (B)(a) and (B)(e) are conducted at a temperature in the range of from about 90° to about 130° F.

5. The process of claim 1 wherein steps (B)(a) and (B)(e) are conducted using an aqueous medium at an acid or an alkaline pH.

6. The process of claim 5 wherein the steeping medium is acidic and comprises a solution of sulfur dioxide in water.

7. The process of claim 6 wherein the solution has a concentration of from about 2,000 to about 4,000 parts per million of sulfur dioxide in water.

8. The process of claim 5 wherein the steeping medium is alkaline and comprises a solution of sodium hydroxide in water.

9. The process of claim 8 wherein the solution has a pH of from about 10 to about 11.5.

10. The process of claim 1 wherein the total nominal residence time for the wheat solids steeps (B)(a) and (B)(e) is in the range of from about 2 to about 6 hours.

11. The process of claim 1 wherein in step (B)(b) the wheat kernels are reduced to a particle size of no greater than about 700 microns.

12. The process of claim 1 wherein in step (B)(c) the larger endosperm particles have a size of greater than about 53 microns and the smaller endosperm particles have a size of less than about 53 microns.

13. The process of claim 1 wherein in step (B)(d) the size of the larger endosperm particles is decreased to no greater than about 53 microns.

14. The process of claim 1 wherein the mill starch slurry of (B)(e) has a specific gravity of from about 7° to about 9° Baumé.

15. The process of claim 1 wherein the concentrate of (G) has a solids content of about 50% by weight.

16. The process of claim 1 wherein step (E) is conducted by passing the mill starch slurry through a plurality of hydroclones.

17. The process of claim 1 wherein the starch-rich fraction comprises A starch and the protein-rich fraction comprises wheat gluten and B starch.

18. The process of claim 1 which further comprises separating smaller wheat particles from the steeped whole wheat kernels of (B)(a) before milling step (B)(b).

19. The process of claim 18 which comprises recombining the separated wheat particles with the milled wheat kernels of (B)(b).

20. The process of claim 1 wherein a portion of the filtrate of (F) is recycled back to wet milling step (B) for further use as process water in steeping.

* * * * *